United States Patent [19]
Christianson et al.

[11] Patent Number: 5,793,569
[45] Date of Patent: Aug. 11, 1998

[54] THREE PIECE SUSPENSION

[75] Inventors: Mark R. Christianson, Plymouth; Reid C. Danielson, Cokato, both of Minn.

[73] Assignee: Hutchinson Technology, Inc., Hutchinson, Minn.

[21] Appl. No.: 629,838

[22] Filed: Apr. 10, 1996

[51] Int. Cl.[6] .............................. G11B 5/60; G11B 21/21
[52] U.S. Cl. .............................................. 360/104
[58] Field of Search ....................................... 360/104

[56] References Cited

U.S. PATENT DOCUMENTS

| | | | |
|---|---|---|---|
| 4,819,094 | 4/1989 | Oberg | 360/104 |
| 4,991,045 | 2/1991 | Oberg | 360/104 |
| 5,006,946 | 4/1991 | Matsuzaki | 360/104 |
| 5,124,864 | 6/1992 | Matsuzaki | 360/104 |
| 5,185,683 | 2/1993 | Oberg et al. | 360/104 |
| 5,187,625 | 2/1993 | Bleaser et al. | 360/104 |
| 5,446,611 | 8/1995 | Webber | 360/104 |
| 5,452,158 | 9/1995 | Harrison et al. | 360/104 |
| 5,461,525 | 10/1995 | Christianson et al. | 360/104 |
| 5,570,249 | 10/1996 | Aoyagi et al. | 360/104 |
| 5,602,699 | 2/1997 | Khan | 360/104 |

FOREIGN PATENT DOCUMENTS

| | | |
|---|---|---|
| 0644530 A1 | 3/1995 | European Pat. Off. |
| WO 92/05542 | 3/1995 | European Pat. Off. |

*Primary Examiner*—Robert S. Tupper
*Attorney, Agent, or Firm*—Faegre & Benson LLP

[57] ABSTRACT

A three piece suspension with the first piece including a base region and a gimbal region for receiving a head slider mounted thereon. A base plate reinforces the base region to facilitate mounting the suspension to an actuator arm. A stiffener which has an engaging extension projecting from it strengthens the suspension without the need for strengthening flanges and applies the preload force to the slider.

8 Claims, 14 Drawing Sheets

THREE PIECE SUSPENSION

TECHNICAL FIELD

The present invention relates generally to an improved magnetic head suspension assembly (HSA). The HSA is a component within a disk drive which orients a magnetic read/write head over the desired position on the storage media from which information is to be accessed or to which it is to be transferred.

BACKGROUND OF THE INVENTION

With the advent of more powerful computers it becomes increasingly more important to enable a user to access data from storage devices with increased speed and accuracy.

Because there is a need to reduce access times to enable rapid retrieval of data, it has become increasingly more important to reduce undesirable levels of vibration of components within the rigid disk drive. Vibration of drive components can cause instability of the drive's servo system. It also may delay the transfer of data, because data can not be confidently transferred until the amplitude of the vibration has substantially decayed.

The current invention addresses this problem by providing a load beam assembly where the load beam is manufactured from a single layer of sheet material from the head mounting gimbal region to the base region adapted for mounting the suspension to an actuator arm of a disk drive. Also forming a part of the suspension is a stiffener which eliminates the need for strengthener rail functions to suspension preload forces from the load beam spring region to the gimbal and the head slider mounted thereon.

SUMMARY OF THE INVENTION

It is therefore a major object of this invention to provide a head suspension assembly with enhanced performance in bending, in torsional and in lateral stiffness to improve resonance performance.

More specifically, the suspension assembly of the present invention includes a unitary load beam having a gimbal area at one end thereof and a base plate portion adapted for connection to an actuator arm at the other end thereof and also including a stiffener attached to the load beam, the stiffener having an engaging extension adapted for engaging the gimbal tongue in the gimbal area of the load beam.

The invention also includes a magnetic head suspension assembly for attachment to an actuator arm of a disk drive which includes a unitary load beam manufactured from a single continuous sheet of sheet material having no flanges or other strengthening features formed in the surface thereof. The load beam has a gimbal area at one end thereof adapted for receiving a head slider bonded to a longitudinally extending gimbal tongue. The load beam also has a base region at its other end for attachment to an actuator arm and additionally has a spring region intermediate said gimbal area and said base region. The suspension assembly also has a separate stiffener having a portion of its surface attached to the spring area of the load beam with an engaging extension thereof extending over the gimbal area of the load beam engaging the gimbal tongue and applying a preload force thereto at that point on the slider tongue through which the aerodynamic lift of a slider mounted thereon acts.

These and other objects of the present invention will be apparent with reference to the drawings, the description of the preferred embodiment, and the claims.

DETAILED DESCRIPTION OF THE INVENTION

Figure 1:
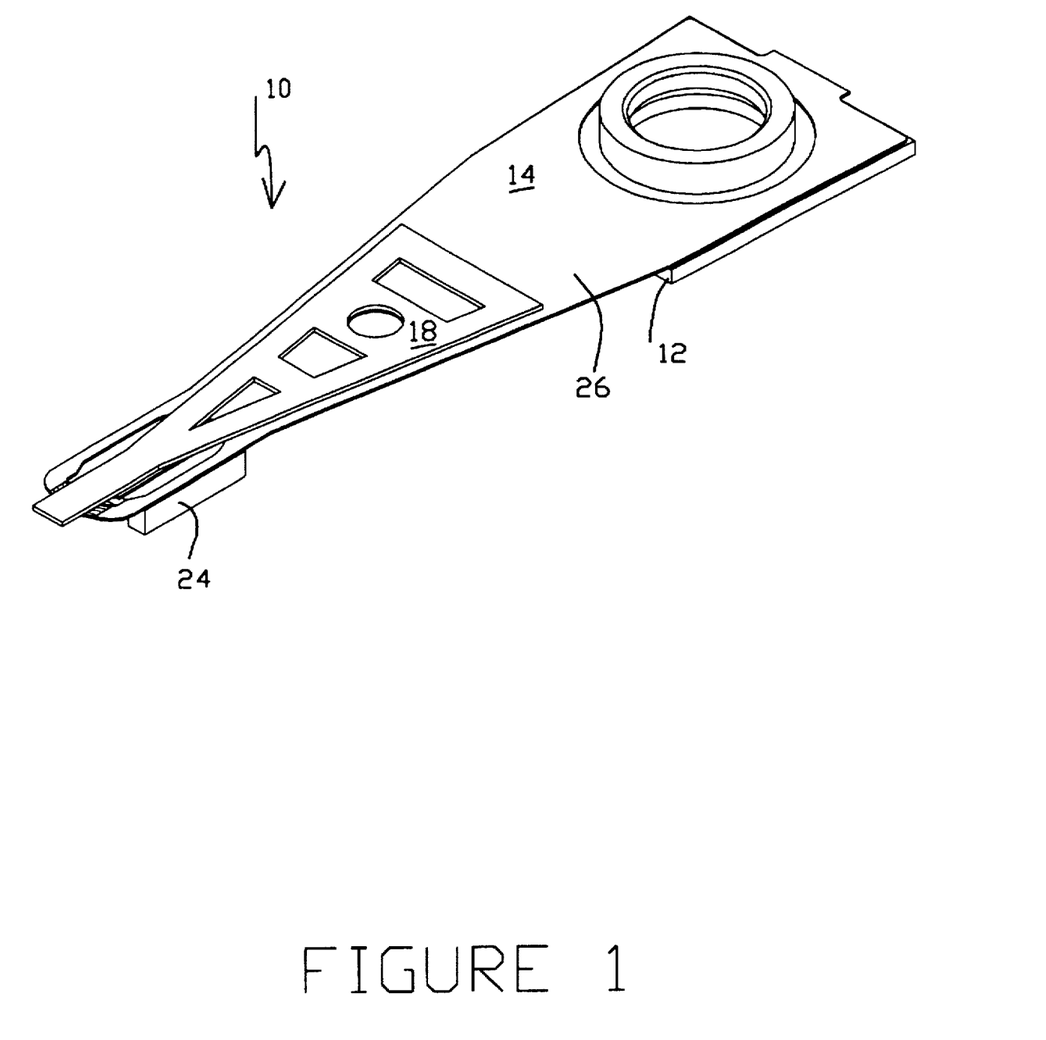
FIG. 1 is an isometric view of a first embodiment of a suspension according to the present invention.
Figure 2:
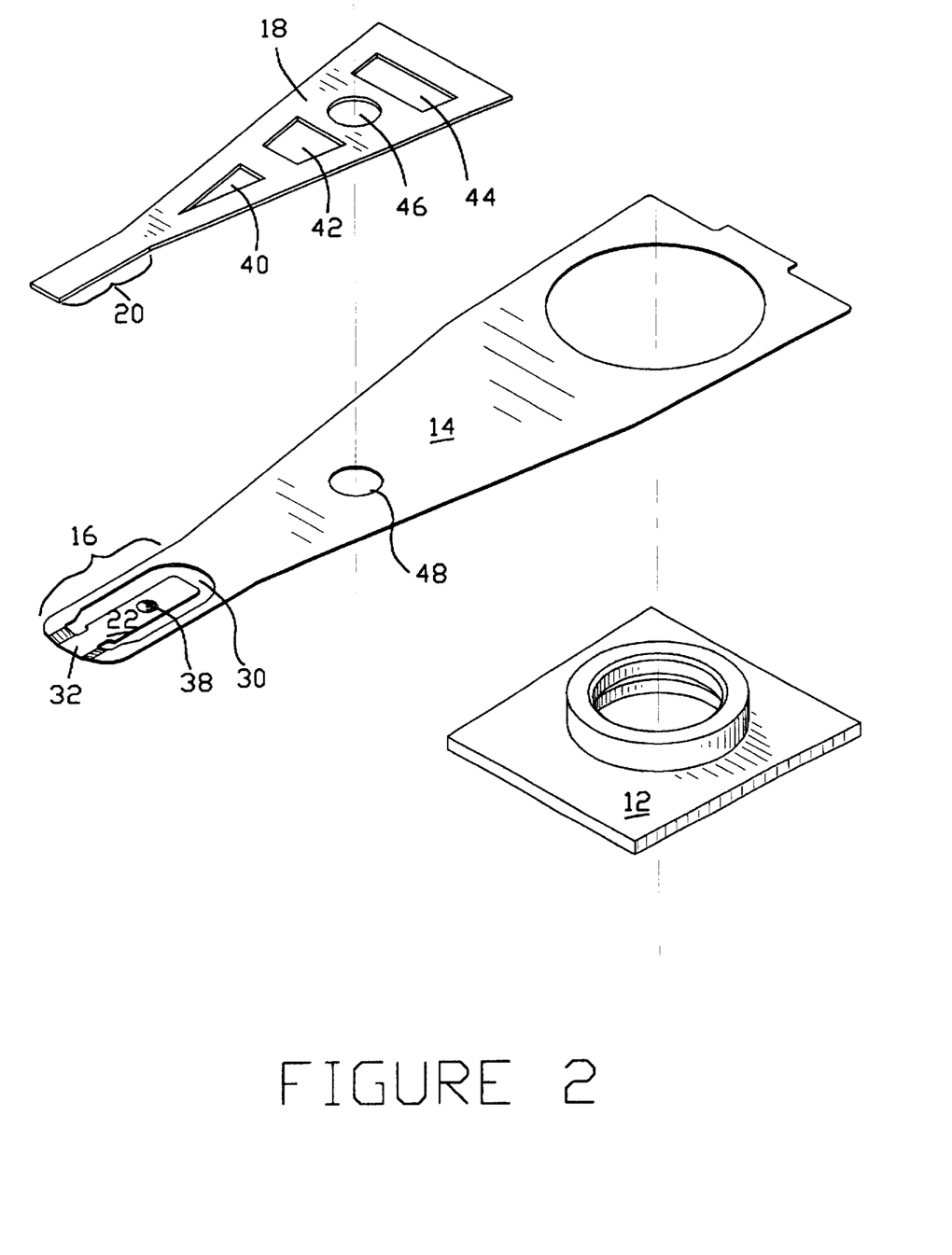
FIG. 2 is an exploded view of the suspension shown in FIG. 1.

FIGS. 1 and 2 show an isometric view of a head suspension assembly 10 in accordance with the present invention. A base plate 12 is attached either adhesively or by welding to one end of a unitary load beam 14 which has a gimbal area 16 at its other end.

Load beam 14 is manufactured from a single continuous piece of sheet material and has no flanges or other strengthening features formed in its surface, as distinguished from conventional load beams which utilize stiffening side rails or flanges at the edges of the load beam to strengthen at least a portion of the mid region located between the base region and the gimbal region. Similarly the load beam does not require the strengthening provided in some conventional suspensions by formed longitudinal ribs in the face of the load beam rather than along the edges of the load beam.

In order to provide the necessary stiffening, a stiffener 18 is attached to load beam 14. It can be of a similar material as the load beam 14 so that it can be attached to the load beam using the same laser beam welding techniques which have been conventionally used to secure the load beam to the base plate.

Alternatively stiffener 18 can be secured to load beam 14 using suitable adhesives rather than by welding. If an adhesive having suitable visco elastic properties is selected, further improved resonant performance for the suspension may be attained.

Suitable adhesives and approaches for providing damping by bonding a constraining member such as the stiffener to a load beam are disclosed in U.S. Pat. No. 4,760,478. In that embodiment of the present invention, the action of the visco elastic materials on the shear forces generated between stiffener 18 and load beam 14 is expected to substantially improve the damping characteristics of the suspension.

In addition to an ability to obtain superior damping performance by using visco elastic materials to secure stiffener element 18 to load beam 14, the suspension shown allows the use of a thinner material for load beam 14 without degrading the resonant performance of the suspension. Utilization of thinner material for the load beam in suspensions often results in deterioration of the resonant performance by reducing the natural frequency of the suspension as the material is thinned. The thickness of the load beam 14 sheet material is 0.02 mm and the thickness of the stiffener 18 is 0.07 mm in the preferred embodiments of the present invention.

The stiffener has an engaging extension 20 which projects over the gimbal area 16 of load beam 14 and contacts gimbal tongue 22. The stiffener 18 in the embodiments shown is also made from a single piece of sheet material and includes no formed rails or ribs for strengthening.

To complete the head suspension, a slider 24 is adhesively mounted on the face of gimbal tongue 22 opposite to the face engaged by the engaging extension 20 of stiffener 18 using conventional techniques.

Figure 3:
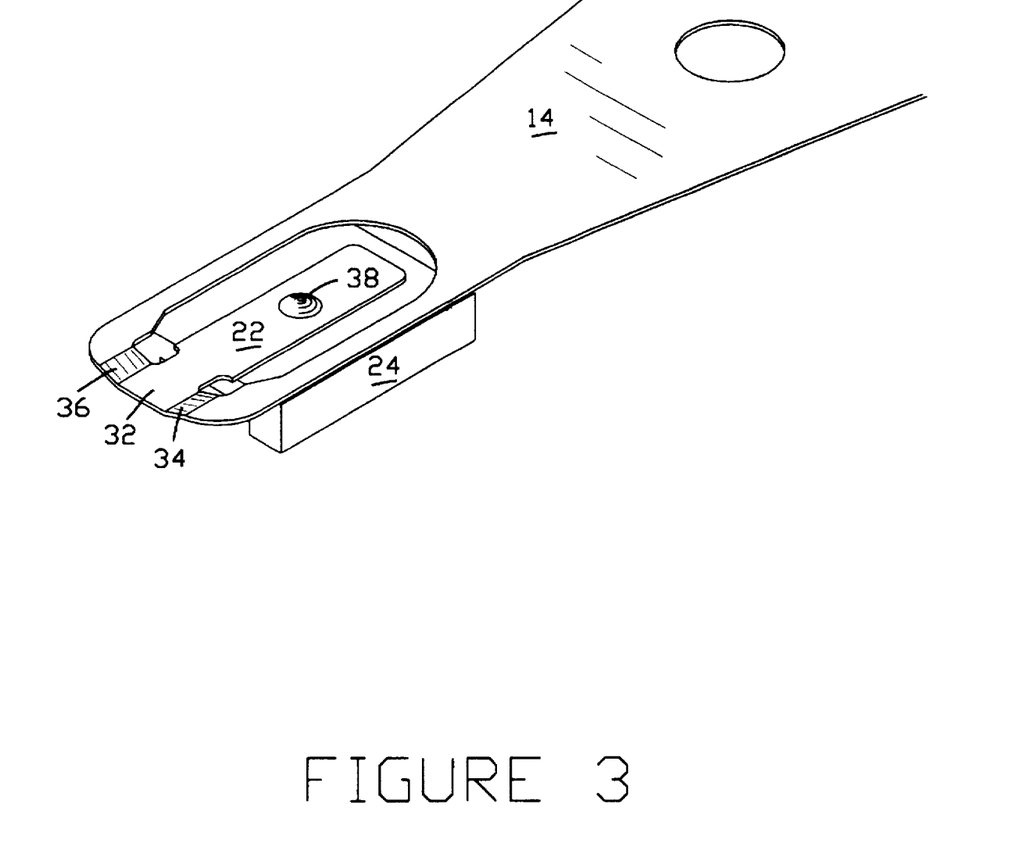
FIG. 3 is a detailed view of the gimbal region of the suspension shown in FIG. 1 with the stiffener means omitted.

FIG. 2 shows all of the elements of the suspension assembly of FIG. 1 with the exception of the slider, while FIG. 3 shows the embodiment of FIGS. 1 and 2 in a detailed view of the gimbal region shown in FIG. 1 with the stiffener 18 omitted for illustrative reasons.

Load beam 14 as shown in FIG. 1 is manufactured from a single continuous piece of sheet material with no flanges or other strengthening features formed in its surface. In this and the other specific embodiments illustrated herein, there is no etching or partial etching of the surface of the load beam. The base plate 12 is secured to the load beam in the base region area preferably utilizing either welding or adhesive means. It has been found expedient in many cases to use laser beam welding techniques to bond base plate 12 to load beam 14.

Load beam 14 provides the spring force for the preloading the suspension in the spring region identified in FIG. 1 with reference character 26. Spring region 26 is a part of the mid region of load beam 14 which extends from the gimbal region to the base region. In spring region 26 there is no reinforcement of the single sheet of spring material. Throughout the remainder of the load beam region the stiffness of the load beam sheet material 14 is enhanced either by the base plate 12 or the reinforcing or stiffening of stiffener 18.

Stiffener 18 adds strength to the sheet material of the load beam 14 thereby eliminating the need for traditional rails, flanges or other formed portions which stiffen the load beam and allow for transmission of the suspension preload force from spring region 26 to slider 24 mounted in the gimbal area 16 of suspension 12. The use of the stiffener 18 allows selection of thinner sheet materials for load beam 14 thereby providing a more suitable material for the highly compliant gimbal spring region than those otherwise attainable in suspensions. With thicker materials associated with the prior art, a technique has been used to selectively partial etch the material of the spring arms of the gimbal spring region to reduce its thickness and make the spring arms more compliant. Because the starting materials, in accordance with the present invention, can be thinner, there is no need to selectively partial etch the gimbal region to provide a more compliant gimbal area 16.

FIG. 2 illustrates the structure of gimbal area 16 of load beam 14. As can be seen from the drawing, the continuous layer of sheet material of load beam 14 has a C-shaped slot 30 which surrounds gimbal tongue 22 which is longitudinally extending from a crossbar 32 which is at the extreme proximal end of the load beam. C-shaped slot 30 is either etched or cut into the single continuous sheet of sheet material from which load beam 14 is manufactured in order to define the outlines of gimbal tongue 22. In order to provide clearance between the surface of slider 24 when it is attached to a face of gimbal tongue 22 the plane of gimbal tongue 22 is displaced from the plane of the remainder of the gimbal region 16 by a forming process which creates a pair of transition regions 34 and 36 while displacing the plane of gimbal tongue 22 downwardly from the plane of load beam 14 as shown on FIG. 3.

An upwardly projecting load protuberance or dimple 38 is shown on FIG. 3 and FIG. 2. Load protuberance 38 bears against engaging extension 20 of stiffener 18 when the suspension is fully assembled as in FIG. 1. The location for the load protuberance on the face of gimbal tongue 22 is selected to allow for application of a preload force generated by the flexing of spring region 26 of load beam 14 to the gimbal tongue 22 and slider 24 so that the force acts through the point in the slider to oppose the aerodynamic lift of the slider without generating undue torque on head slider 24 causing it to alter its attitude from the desired flying attitude.

The stiffener 18 of the first embodiment as shown in FIGS. 1 and 2 has a triangular hole 40 and trapezoidal holes 42 and 44 which are symmetrically positioned along the longitudinal axis of stiffener 18 and serve to reduce the mass of the stiffener thereby increasing the resistance of the overall suspension to shock loading by limiting the mass induced separation force due to shock acceleration, primarily in the vertical axis. The separation force can result in the slider oscillating at the end of the load beam and causing damage to the disk as the skewed slider impacts the disk surface. A tooling hole 46 in stiffener 18 may be aligned with tooling hole 48 in the surface of load beam 14 to facilitate the positioning of stiffener 18 before it is permanently attached to load beam 14 using welding adhesive or other methods. Alternatively the hole in the stiffener 18 may be oversized and the positioning of stiffener 18 relative to a particular location on load beam 14 is accomplished using tooling hole 48 in conjunction with further guide holes on carrier strips used for the initial manufacture of the individual parts in general accordance with the teachings of commonly assigned patent U.S. Pat. No. 5,391,842.

Figure 4:
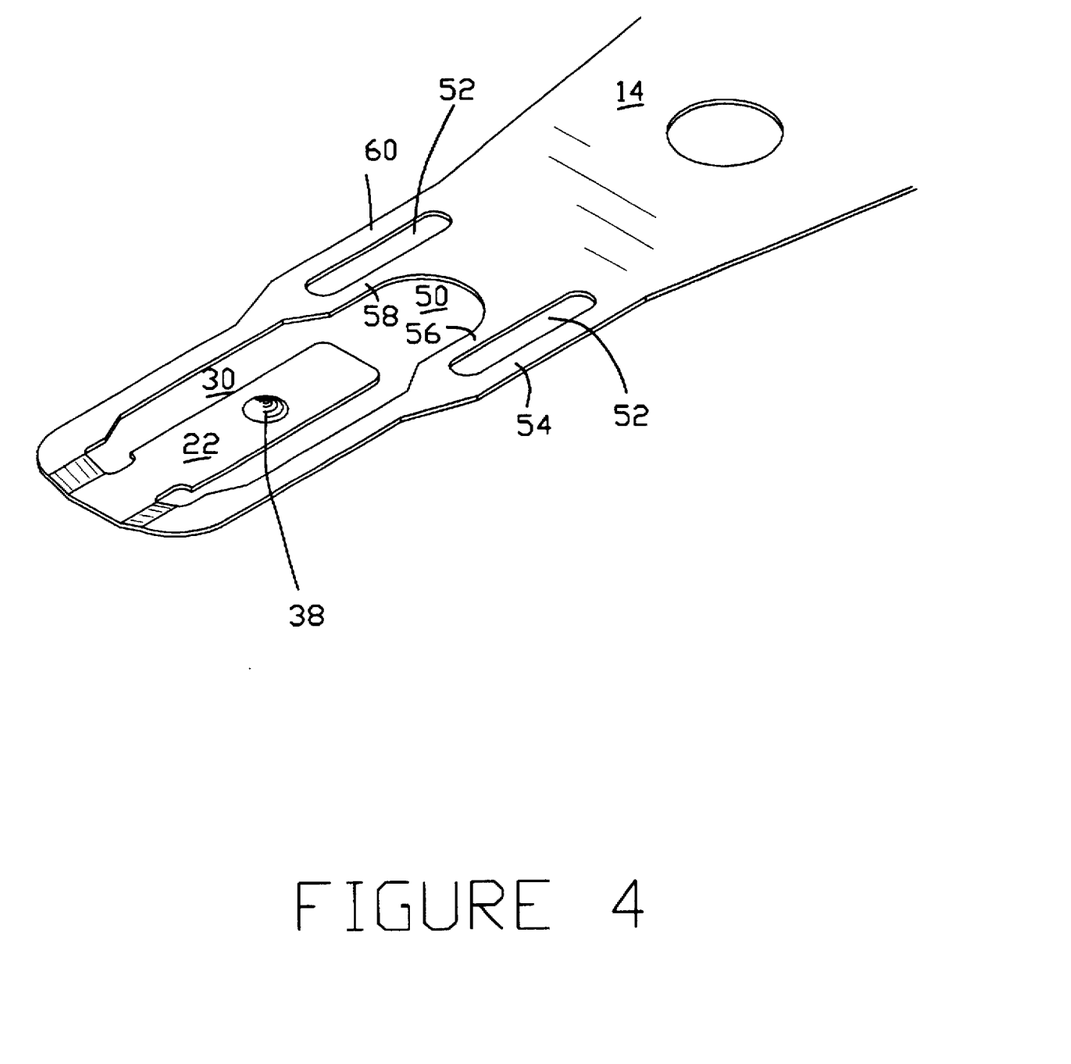
FIG. 4 is a detailed view of a gimbal region of a further embodiment of a suspension according to the present invention.

In FIG. 4 an alternative embodiment of a gimbal structure for use in the inventive suspension is shown in detail in connection with the suspension which is otherwise similar to that shown in FIGS. 1 through 3. In the embodiment shown in FIG. 4 however the C-shaped slot 30 is elongated longitudinally toward the base end of load beam 14 to provide a larger opening 50 along the longitudinal axis of load beam 14 and on both sides of the opening 50 there are additional longitudinally extending slots 52 which in the embodiment shown are generally displaced symmetrically about the longitudinal axis of load beam 14. Regions 52, in addition to reducing the mass of the load beam also reduce primarily the roll axis stiffness and secondarily the pitch axis stiffness of the gimbal region by reducing the effective width of the load beam substantially in the region where the regions 50 and 52 are aligned across the face of load beam 14 to provide what are effectively narrow spring arms 54, 56, 58 and 60 as shown on FIG. 4.

Figure 5:
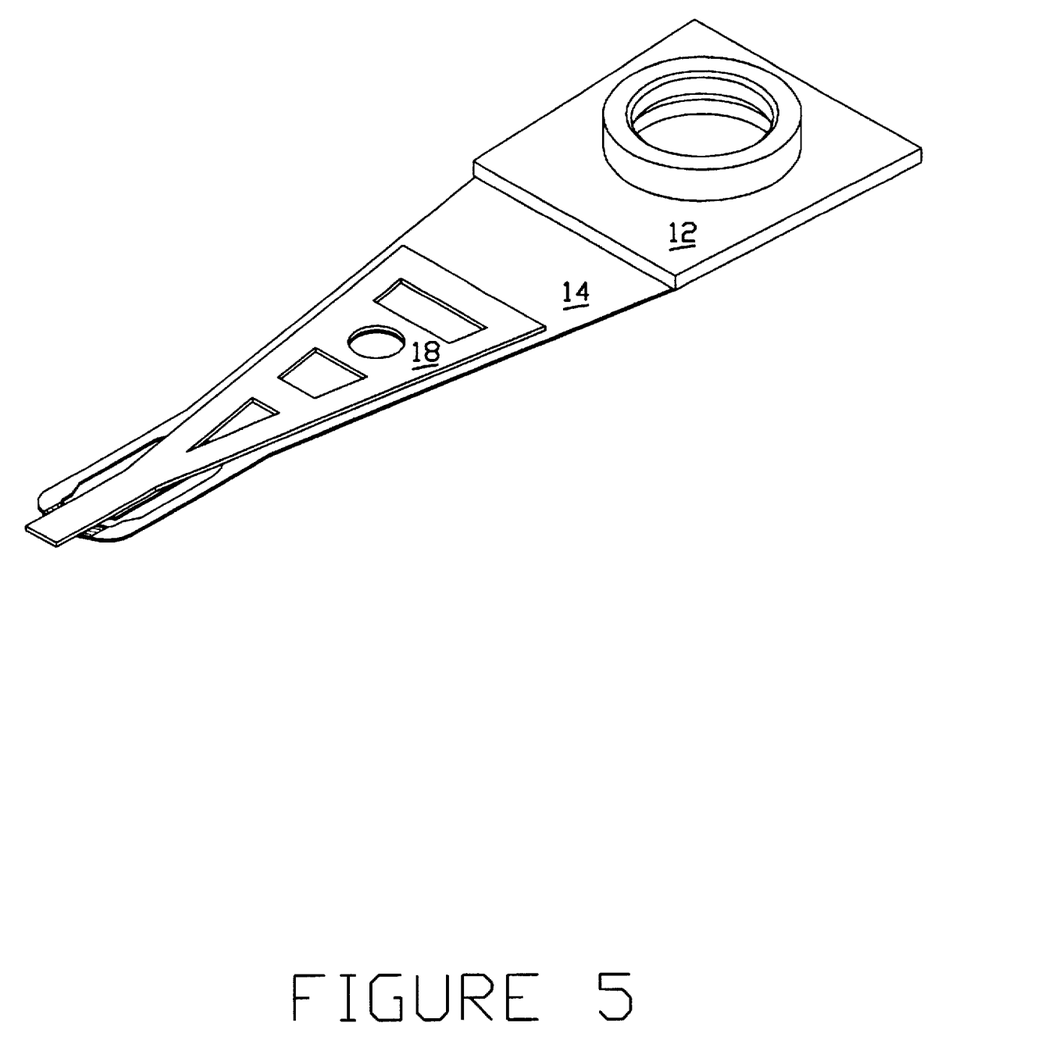
FIG. 5 is an isometric view of another embodiment of the suspension according to the present invention.

FIG. 5 shows an alternative embodiment of a suspension wherein the base plate 12 is mounted on the same face of load beam 14 as stiffener 18. In this configuration, it is possible to increase the loading clearance when the suspensions are stacked for a multi-disk disk drive by increasing the back to back spacing of suspensions. Because the suspension shown in FIG. 5 does not have any flanges or rails to stiffen the rigid portion of the load beam the concerns regarding disk to rail clearance limitations can be avoided.

Because the welds between load beam 14 and base plate 12 are on the bottom of the suspension as shown in FIG. 5, there are no welds on the side of base plate 12 where the suspension is mounted to the e-block of the disk drive actuator. The fact that the variations in height due to weld protrusion are not a factor in this configuration reduces the variation in mounting height which may be otherwise introduced in suspension configurations wherein the welds between the load beam and the base plate are on the side of the load beam that engage the e-block. Furthermore, the configuration shown on FIG. 5 also allows use of a welding system with only a single welding beam direction so that one-sided thin-to-thick welding can be used for securing both the stiffener 18 and base plate 12 to load beam 14 with a minimum of welding time.

Figure 6:
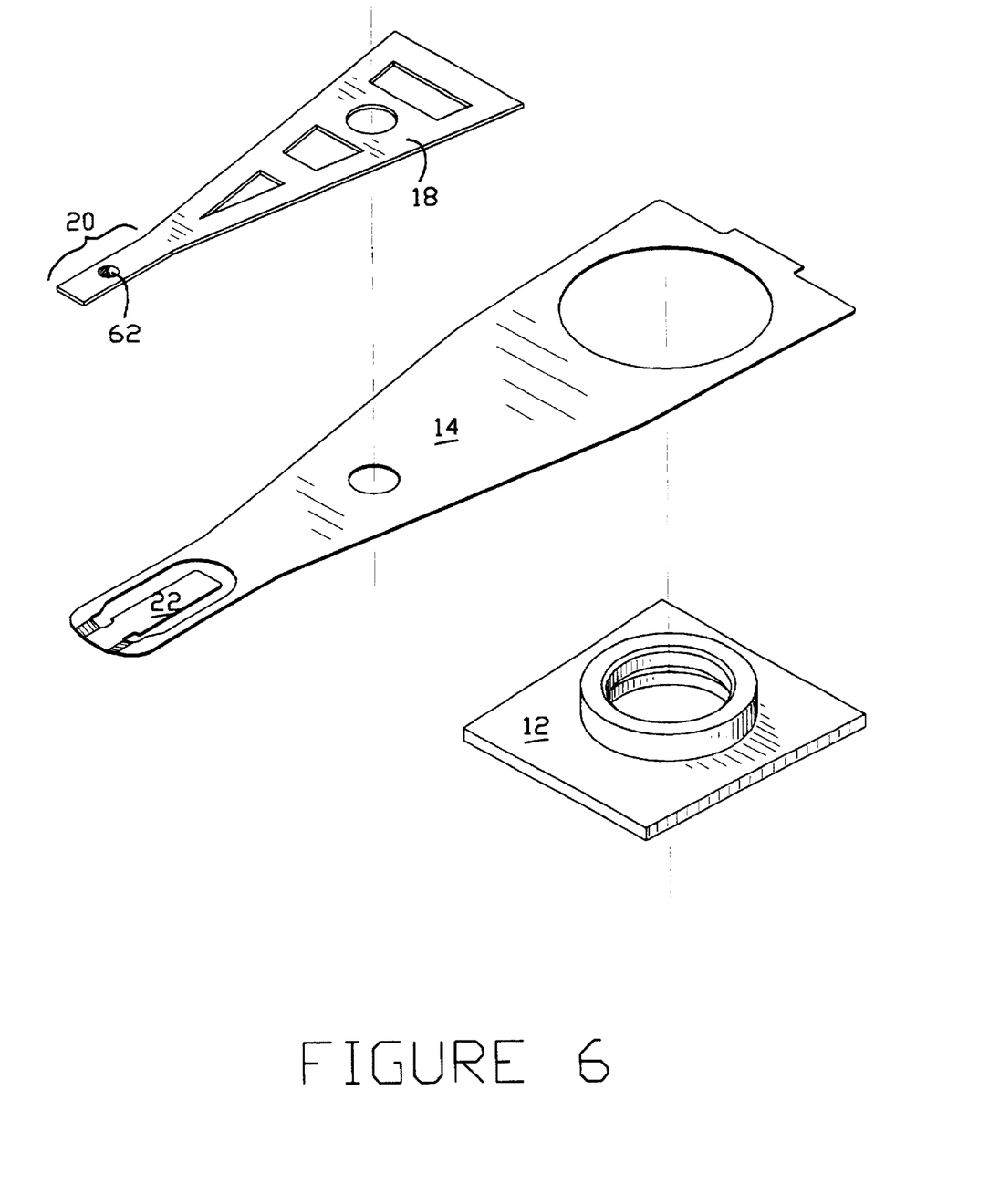
FIG. 6 is an exploded view of the elements of the suspension shown in FIG. 5.

In the alternative embodiment of the invention shown in FIG. 6, a load protrusion or dimple 62 projects downwardly from stiffener 18 to engage gimbal tongue 22 of load beam 14 as distinguished from the configuration in FIG. 1 wherein the load protrusion 38 or dimple is formed on the surface of gimbal tongue 22. Placing the load protrusion 62 on the engaging extension 20 of stiffener 18 allows the suspension to be used with smaller slider formats where it would be otherwise difficult to apply a load protrusion 38 directly to the gimbal tongue without introducing substantial manufacturing difficulties. Utilizing a load protrusion 62 on stiffener 18 rather than gimbal tongue 22 can also shift the center of rotation of the suspension such that the width of the first torsion notch is increased to improve the resonant performance of the suspension.

Figure 7:
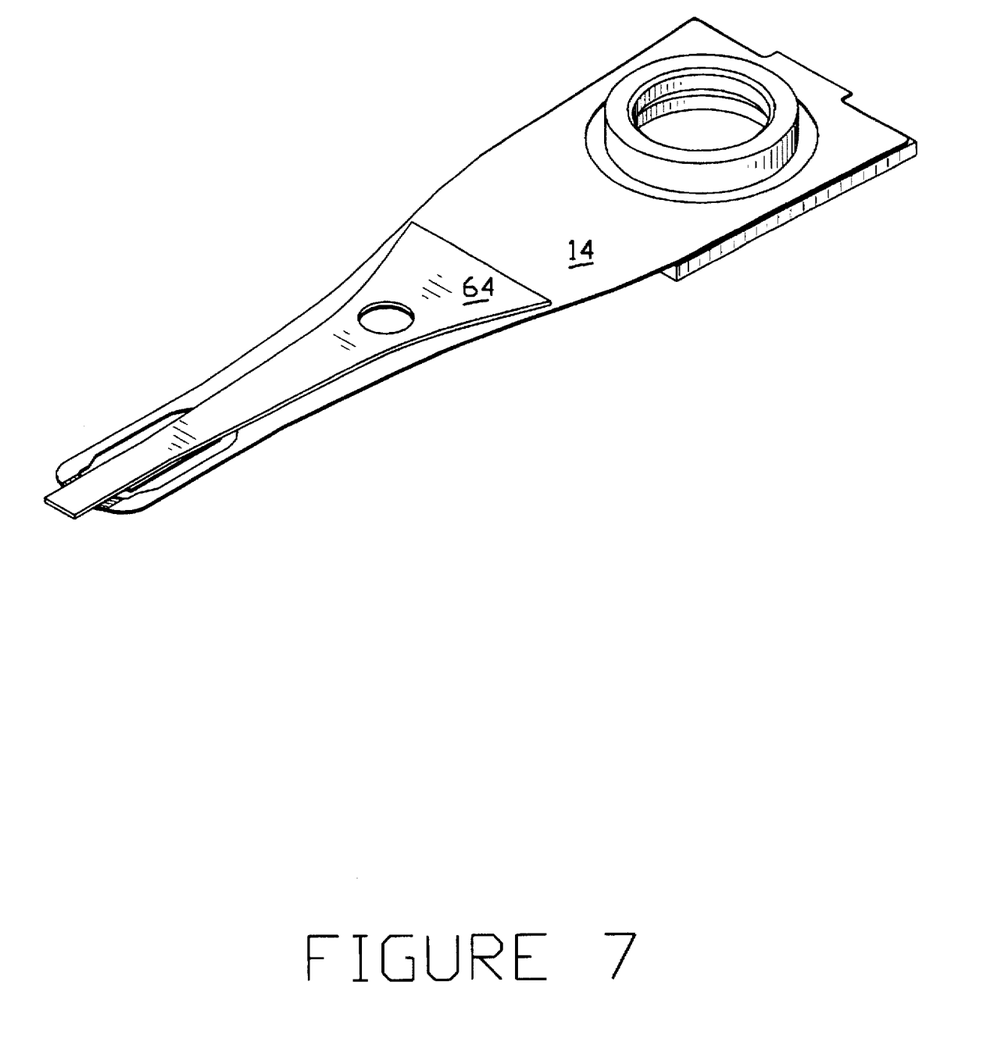
FIG. 7 is an isometric view of another embodiment of a suspension according to the present invention.

In FIG. 7 a further embodiment of the invention is shown wherein a modified stiffener 64 is mounted on a suspension 14 which conforms generally to the suspension embodiment shown at FIG. 1 except that both stiffener 64 and load beam 14 are narrowed significantly throughout a substantial portion of the rigid portion of load beam 14. Using this configuration, the resonant performance of the suspension is improved and the torsional frequencies are substantially increased while there is some diminishing of the sway frequency.

Figure 8:
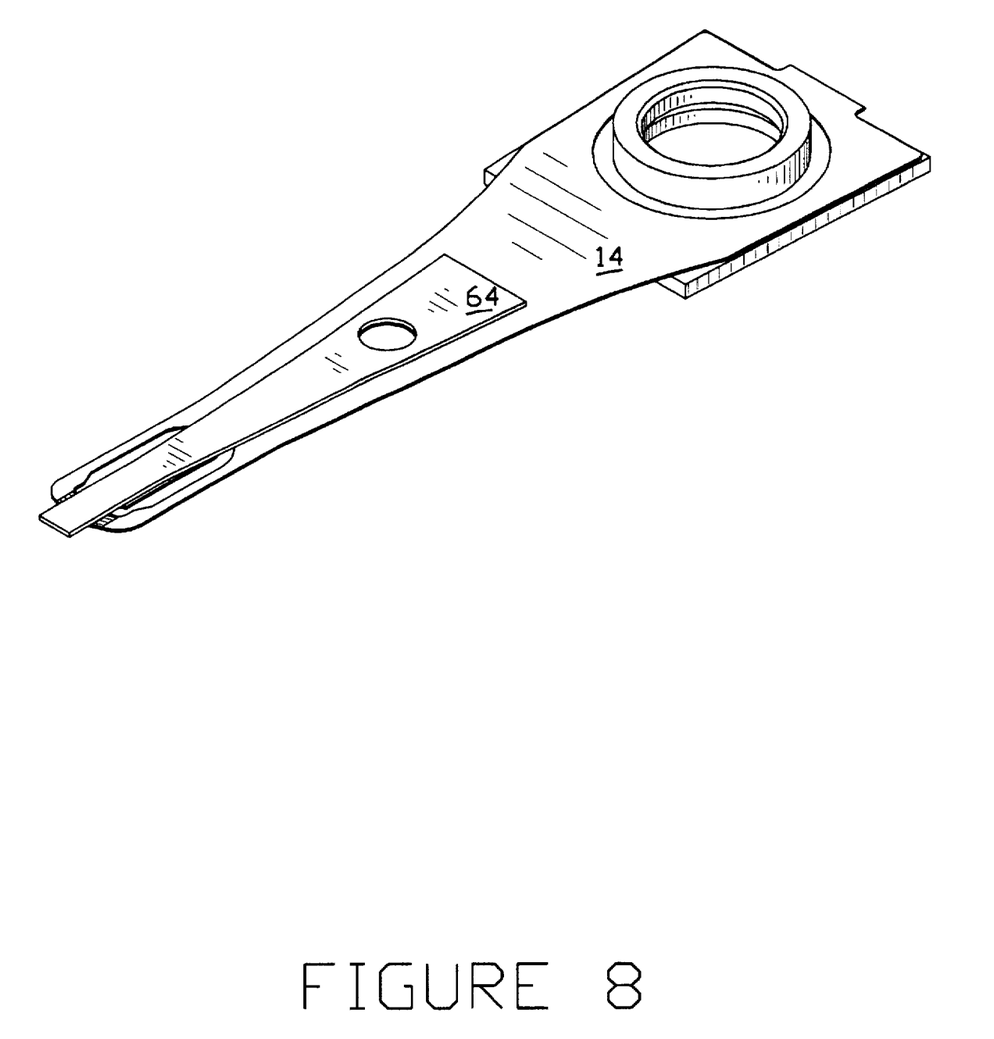
FIG. 8 is an isometric view of a still further embodiment of the present invention.

FIG. 8 is an embodiment of the invention which utilizes the narrowing of the load beam 14 and stiffener 64 illustrated in FIG. 7 and makes them even narrower than they were in the embodiment shown at FIG. 7 and increases the proportion of the length of the load beam that is narrowed. The contouring illustrated in FIGS. 7 and 8 can be used to optimize the resonant performance of the load beam by tuning characteristics such as the resonance or frequencies and gains, the resonance notch width, the load beam deflection, shock performance and the hub clearance of the suspension and slider.

Figure 9:
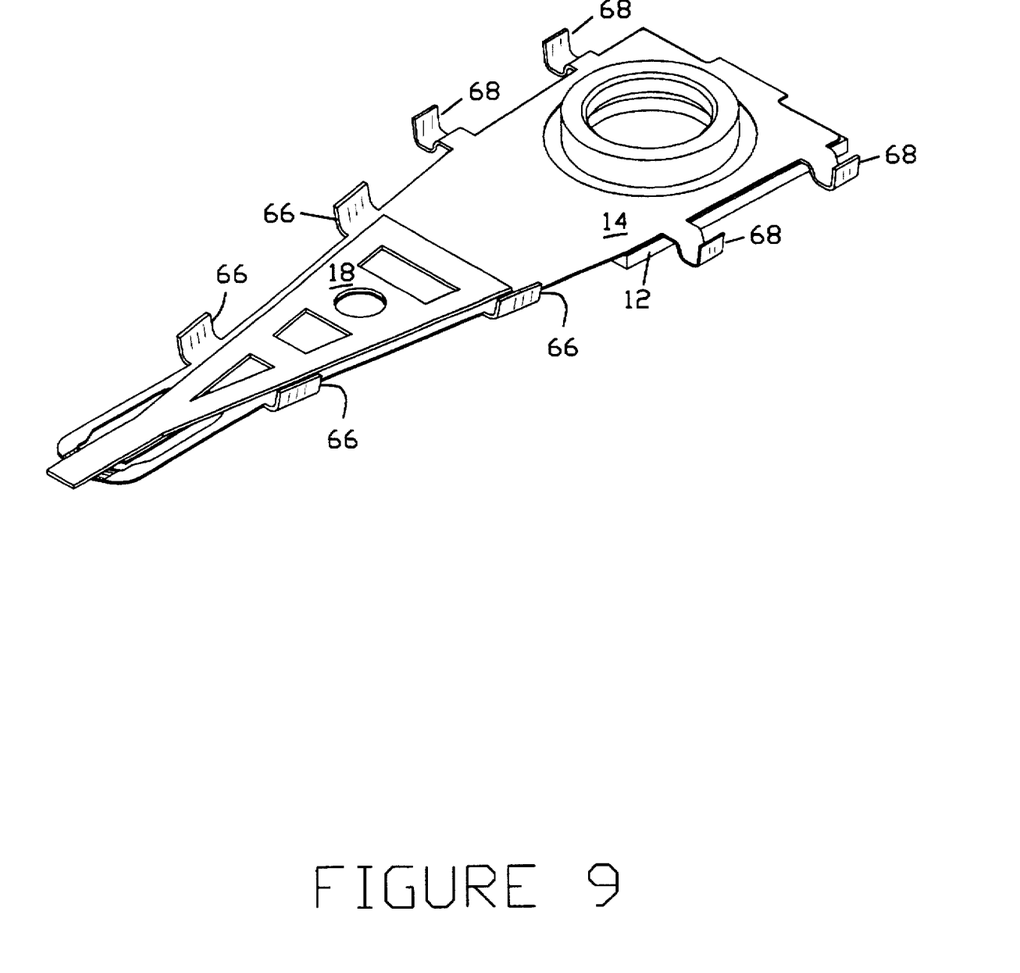
FIG. 9 is an isometric view of a still further embodiment of the present invention.

In the embodiment shown at FIG. 9, there are tabs 66 shown on the rigid portion of the load beam and tabs 68 shown projecting from the base region of load beam 14. Tabs 66 and 68 can be used for routing lead wires to and from the slider (not shown in FIG. 9).

Figure 10:
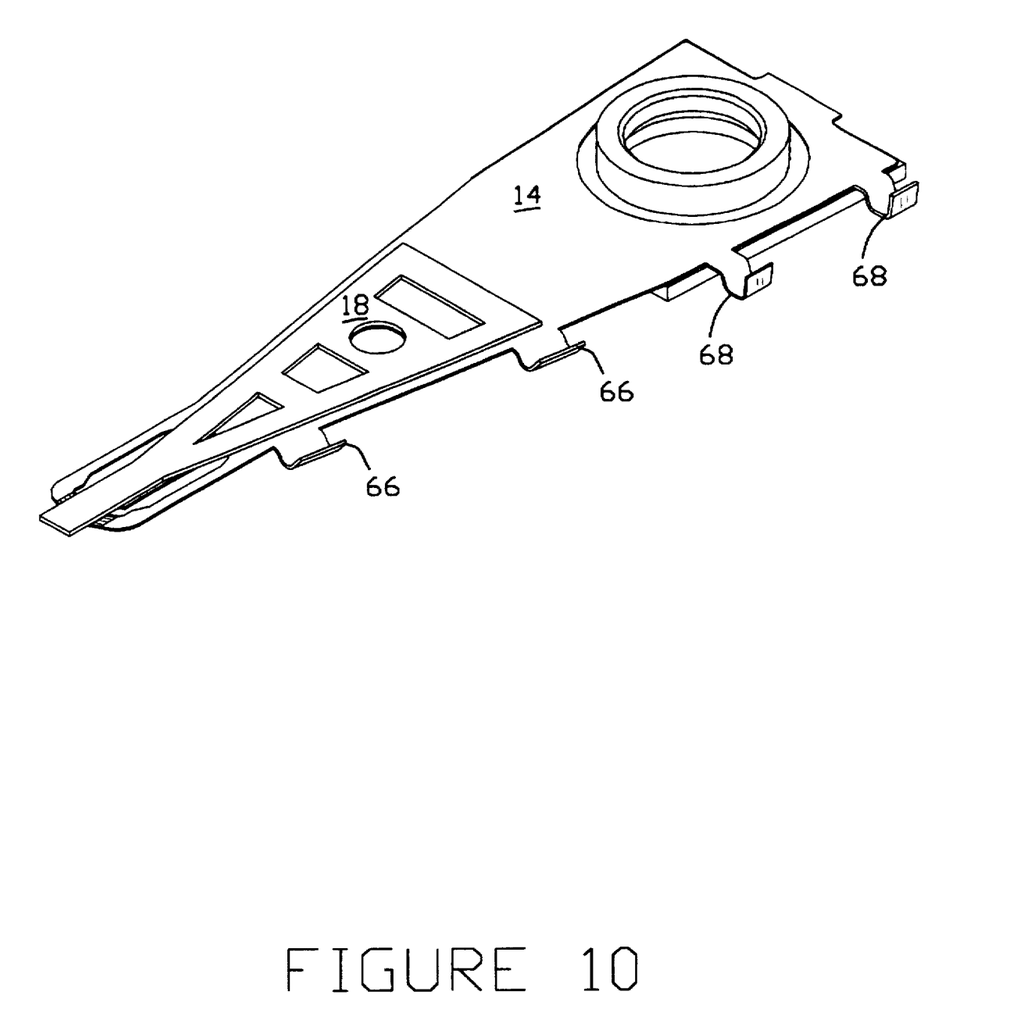
FIG. 10 is an isometric view of a still further embodiment of the present invention.

The embodiment of the invention shown at FIG. 10 is a further modification of the version shown in FIG. 9. In the FIG. 10 embodiment, the wire routing feature enabled by the tabs 66 and 68 are utilized only on one side of the load beam 14. This approach provides certain operational advantages over the embodiment shown at FIG. 9 because the hub clearance of the suspension is the increased. Additionally the embodiment as shown at FIG. 10 has a lower mass than the configuration shown in FIG. 9. The rigidity of the overall suspension caused by the strength of load beam 14 by stiffener 18 allows use of the asymmetry illustrated in FIG. 10 because the single-sided forming does not introduce bending modes in the suspension which can be coupled into motion of slider 24 off track due to movement introduced by resonant bending modes.

Figure 11:
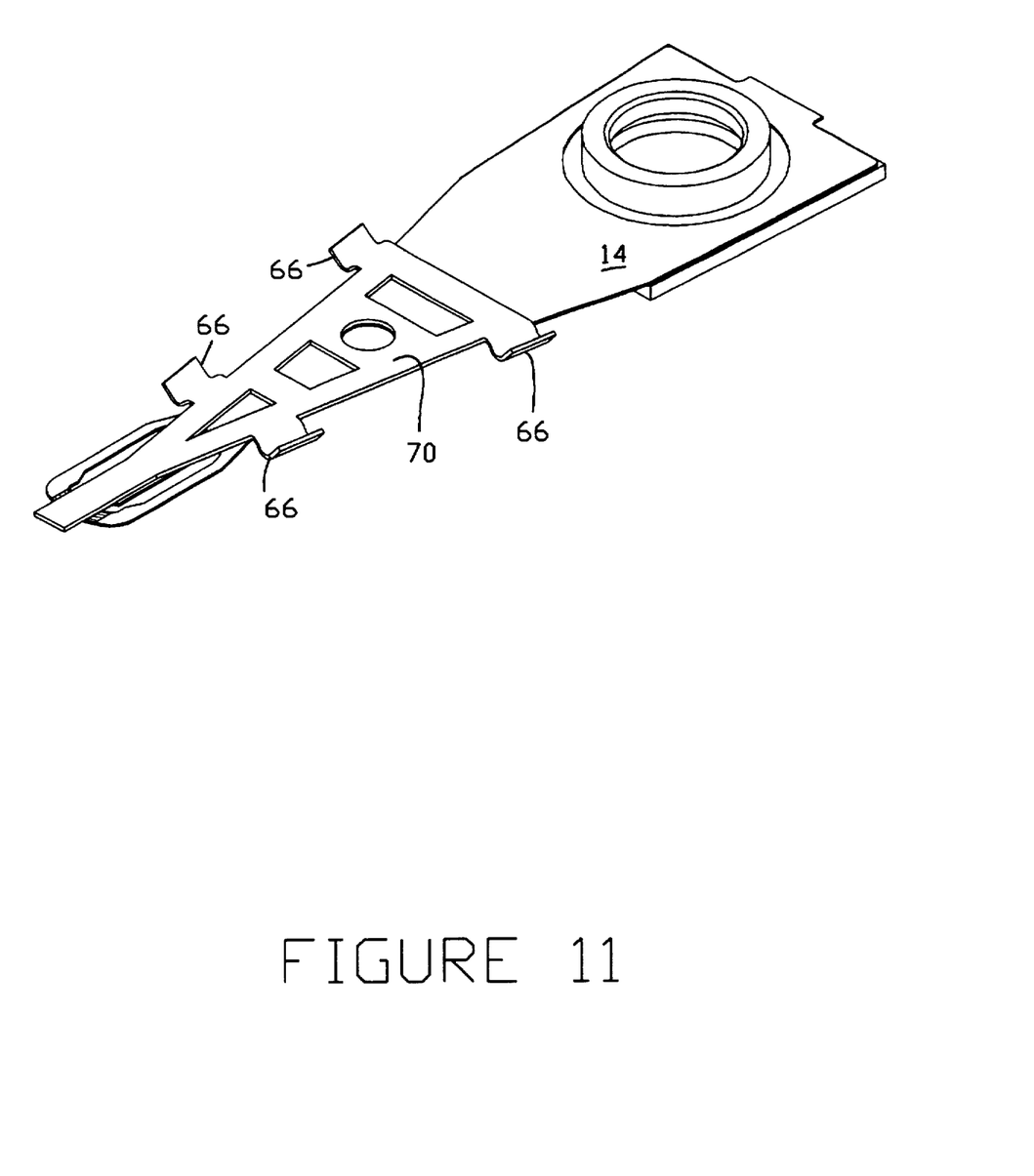
FIG. 11 is an isometric view of a still further embodiment of the present invention.

In FIG. 11, stiffener 70 has the tabs 66 projecting from it rather than the surface of load beam 14.

Figure 12:
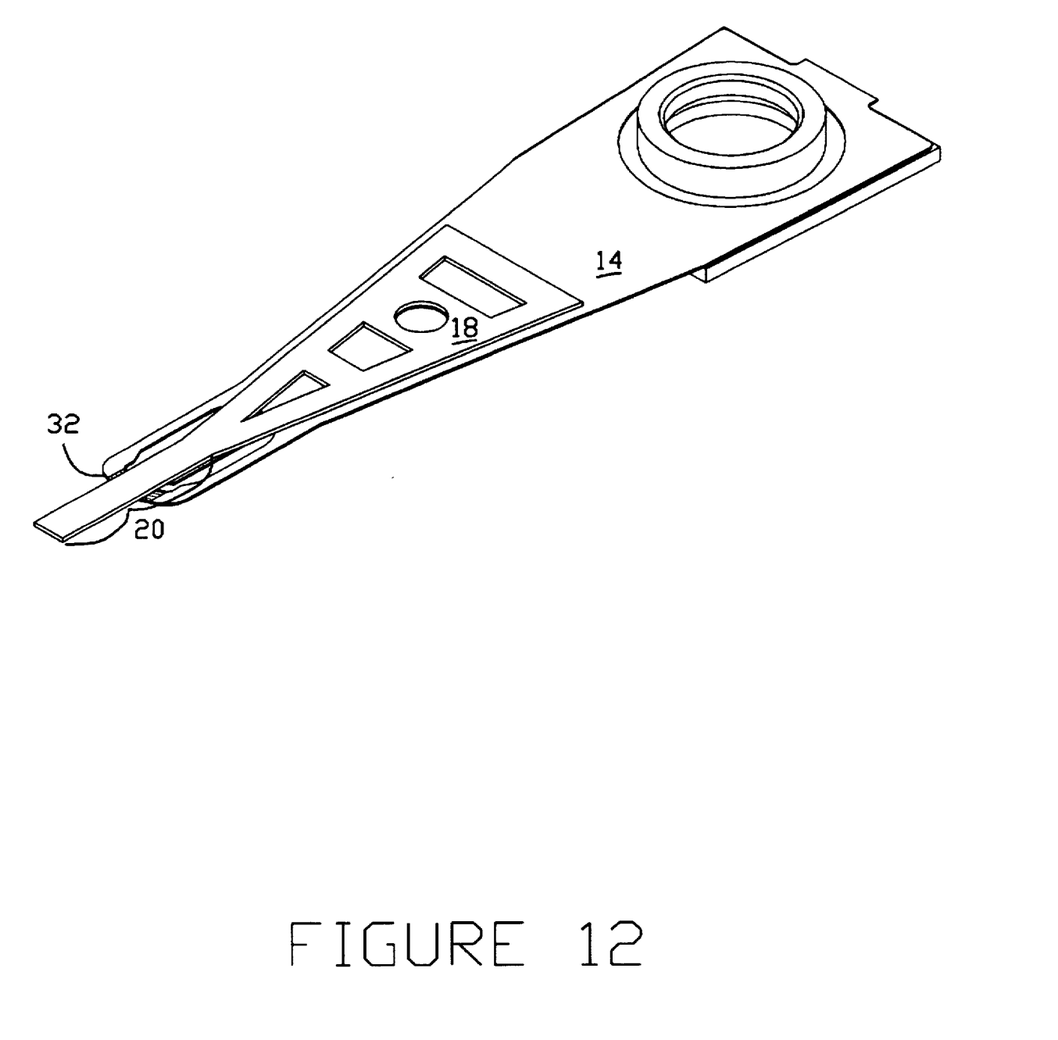
FIG. 12 is an isometric view of a still further embodiment of the present invention.

In FIG. 12, the engaging extension 20 of stiffener 18 is extended well beyond the crossbar 32 at the tip of the gimbal area 16 of load beam 14 so that it is accessible for lifting the tip of the suspension and slider 24 or for assisting in rotationally locating the slider. Alternatively, in a still further embodiment, not shown, the extension 20 can be shorter than that illustrated in FIG. 12 and terminate at load protusion 38.

Figure 13:
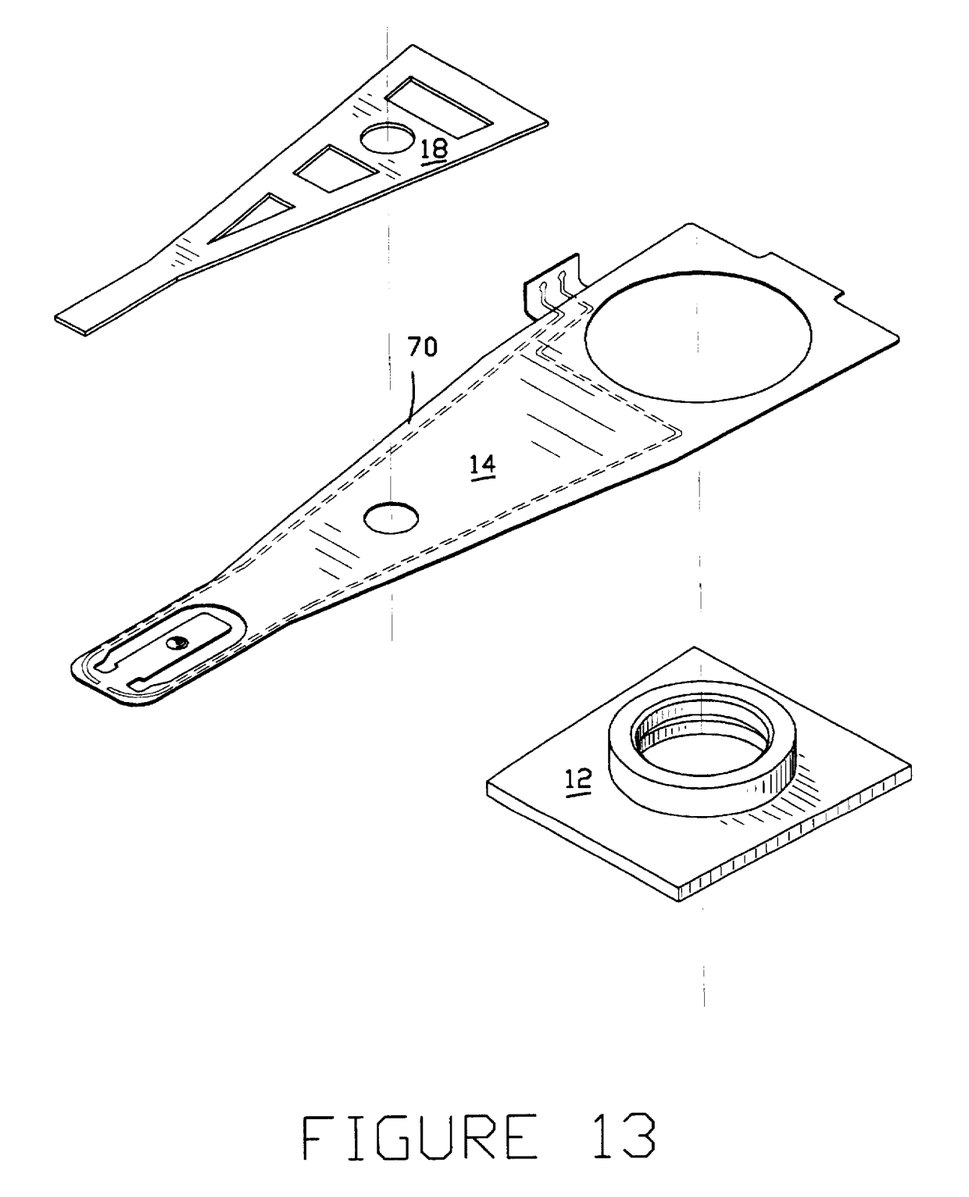
FIG. 13 is an exploded view of the elements of another embodiment of the invention.

In the configuration shown in FIG. 13, the suspension has a conductive trace on the opposite face of load beam 12 from the face to which stiffener 18 is attached. Copending applications showing the use of conductive traces on the surface of load beams generally include U.S. Pat. No. 5,491,597 issued Feb. 13, 1996 and application Ser. No. 08/227,978 filed Apr. 15, 1994 both of which are owned by the assignee of the present invention.

Figure 14:
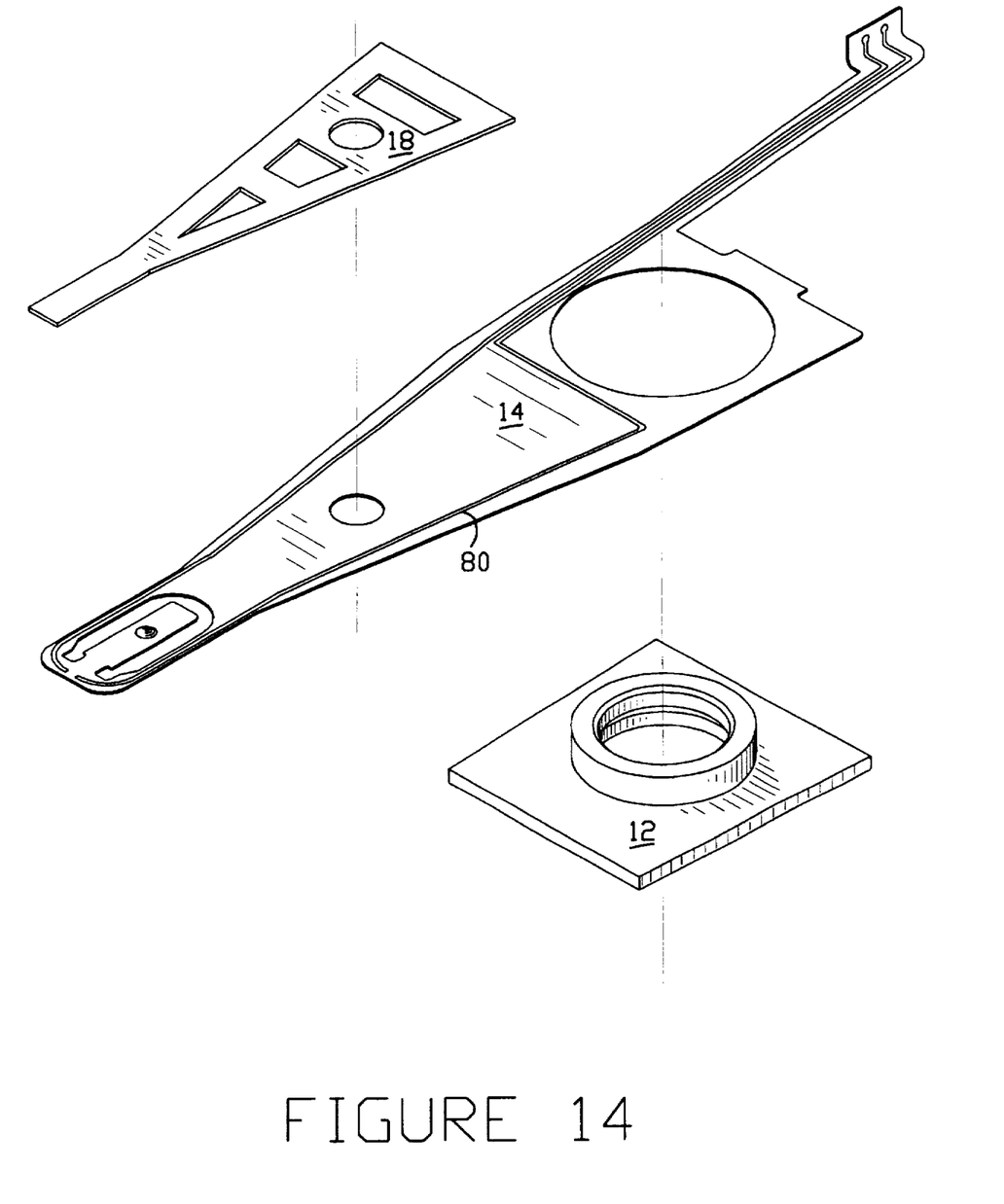
FIG. 14 is an exploded view of the elements of yet another embodiment of the invention.

In FIG. 14, trace conductors appear on the face of the load beam to which the stiffener element 18 is attached. The width of stiffener 18 is selected to leave sufficient space on the surface of the load beam 14 outside the width of stiffener 18 to provide for routing of the traces.

Although the present invention has been described with reference to preferred embodiments, workers skilled in the art will recognize that changes may be made in form and detail without departing from the spirit and scope of the invention.

What is claimed is:

1. A head suspension for supporting a head slider relative to a surface of a rigid disk within a rigid disk drive, the head suspension comprising:

a unitary load beam made from a sheet material comprising a base region for attachment to an actuator of a disk drive, a spring region distal from said base region, a gimbal region at a distal portion of said load beam that includes a gimbal tongue for supporting a head slider, and a load transfer region intermediate of said spring region and said gimbal region; and a stiffener attached to said load transfer region of said load beam and including an engaging extension in contact with said gimbal tongue of said gimbal region of said load beam, said stiffener overlying at least a portion of said load transfer region without interfering with said spring region, wherein, said stiffener is comprised of a similar material as the sheet material making up said unitary load beam, and said stiffener is thicker than the sheet material of said unitary load beam.

2. The head suspension of claim 1 further including a base plate attached to said base region of the load beam and wherein the base plate is manufactured from material thicker than the sheet material of said load beam.

3. The head suspension of claim 2 wherein the base plate is attached to an opposite side of the load beam from the stiffener.

4. The head suspension of claim 1 wherein the stiffener is attached to the load beam by welding.

5. The head suspension of claim 1 wherein the stiffener is attached to the load beam by an adhesive compound.

6. The head suspension of claim 5 wherein the adhesive compound has a strong visco-elastic effect thereby enhancing the vibration damping characteristics of the suspension assembly.

7. The head suspension of claim 1 wherein edges bordering a mid region of the load beam taper from a wider first width at the base region to a narrower second width at the gimbal region and wherein the edges defining those portions of the stiffener adjacent a mid region of the load beam taper from a first width to a narrower second width at the engaging extension, both of the widths of the stiffener being narrower than the corresponding widths of the load beam to leave at least a portion of the surface of the mid region of the load beam uncovered by the stiffener.

8. The head suspension assembly of claim 1 wherein the stiffener is provided with holes that are symmetrical about a longitudinal axis of the head suspension.

* * * * *